3,410,457
SEASONING FORK
Chester A. Brown, 208 E. 60th St.,
Chicago, Ill. 60637
Filed June 24, 1966, Ser. No. 560,197
2 Claims. (Cl. 222—191)

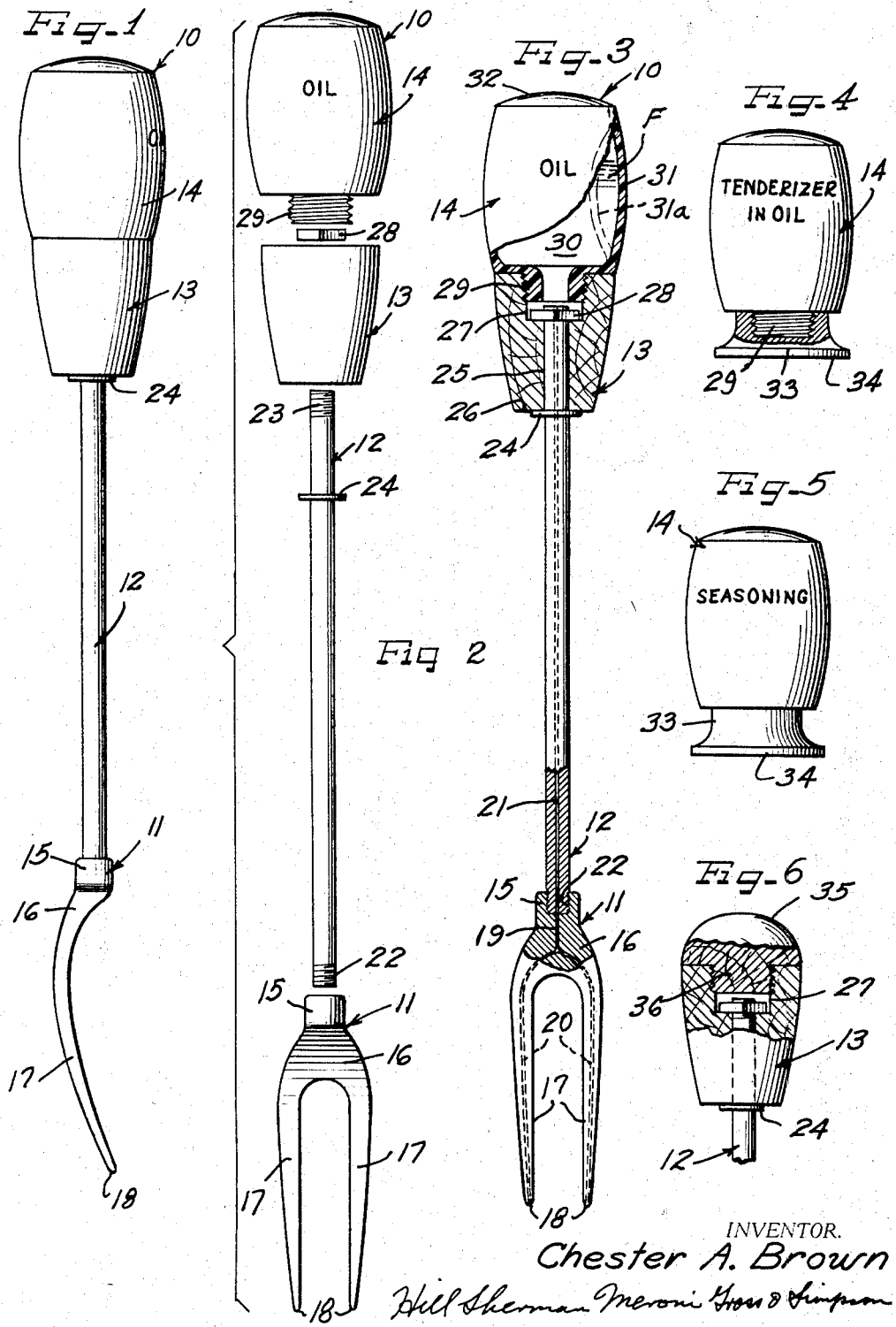

ABSTRACT OF THE DISCLOSURE

A fork for barbecue grilling of meats and the like having a stem and tines with registering small diameter bores, a handle on the end of the stem and a squeeze bottle detachably connected to the handle and contoured to complete the handle. A plurality of squeeze bottles are supplied with each fork and will contain different fluid materials such as seasoning, tenderizers, oil or the like. The contents of the squeeze bottles are forceably ejected through the bores of the stem and tines to be discharged at the points of the tines for direct injection into the meat or the like food stuff receiving the tines. The squeeze bottles are equipped with caps to seal the contents thereof when not attached to the handle.

---

This invention relates to a utensil for supporting food stuffs or the like and for injecting fluid into the supported material. Specifically, the invention relates to a barbecue fork adapted to inject tenderizer, seasoning or the like materials into meat handled by the fork.

An important feature of this invention is the provision of a seasoning fork with an easily attachable squeeze bottle handle portion to inject the contents of the squeeze bottle through the fork into food stuffs handled by the fork.

According to this invention, there is provided a fork, especially suited for barbecue grilling of meats which has hollow prongs or tines communicating with a hollow stem and provided with a handle portion selectively receiving resilient squeeze bottles completing the handle and capable of being depressed to eject fluids through the stem and tines into the meat being grilled.

An object of this invention is to provide a household tool for supporting and injecting fluids into food stuffs and the like from resilient squeeze bottles detachably mounted on the tool.

A further object of the invention is to provide a seasoning fork with detachable squeeze bottles for ejecting fluids through the fork into food stuffs supported on the tines of the fork.

A specific object of the invention is to provide a barbecue seasoning fork with a hollow stem and tines, a handle secured on the stem and a resilient squeeze bottle detachably threaded in the handle to complete the handle and to eject fluids through the stem and tines into meat handled by the fork.

Another specific object of this invention is to provide a hollow seasoning fork with a handle selectively receiving a cap or a squeeze bottle.

A still further specific object of this invention is to provide a barbecue seasoning fork with a handle portion having a threaded well into which the neck of a squeeze bottle may be secured for ejecting fluid through the stem and tines of the fork into food stuffs.

Other and further objects of the invention will be apparent to those skilled in the art from the following detailed description of the annexed sheet of drawings which, by way of a preferred example, illustrates one embodiment of the invention.

*On the drawings*

FIGURE 1 is a side elevational view of a seasoning fork according to this invention;

FIGURE 2 is an exploded front elevation of the components of the seasoning fork in FIGURE 1;

FIGURE 3 is a front elevational view of the seasoning fork of FIGURE 1 with parts broken away and shown in vertical cross-section;

FIGURE 4 is an elevational view, with parts broken away and shown in cross-section of a squeeze bottle and cap for applying to the fork of FIGURES 1–3;

FIGURE 5 is a view similar to FIGURE 4, but illustrating the squeeze bottle and cap in complete elevation to show that a number of different squeeze bottles may be used with a single fork of this invention; and FIGURE 6 is a fragmentary elevational view, with parts in vertical cross-section, of the handle end of the fork of FIGURES 1–3 showing a cap for the handle.

*As shown on the drawings*

The seasoning fork 10 of this invention is composed of a metal head 11, a metal stem 12, a wooden handle 13, and resilient plastic or rubber squeeze bottle 14.

The head 11 has an internally threaded cylindrical neck 15, a flattened body portion 16 curving rearwardly from the neck 15, as best shown in FIGURE 1, and a pair of tines 17 extending in spaced parallel relation from the body 16 and converging to sharp tips 18. The tines, with the sharp tip ends, provide prongs adapted to be injected into food stuffs such as meat or the like.

As best shown in FIGURE 3, the neck 15 and body portion 16 have a bore 19 connecting the bottom of the internally threaded neck with bores 20 which extend through the tines 17 to terminate at the points 18.

The stem 12 is a metal tube with a bore 21 therethrough and has a bottom threaded end 22 threaded into the neck 15 so that the bore 21 communicates fully with the bore 19 of the head 11.

The top end of the stem 12 is also externally threaded at 23 and a collar or flange 24 is secured to the stem in spaced relation below the threaded end 23.

The handle 13 is composed of wood, plastic or the like insulating material and has a cylindrical bore 25 extending therethrough from a flat end face 26 to an internally threaded well 27. The bore 25 receives the portion of the stem above the collar 24 and when the end face 26 of the handle is bottomed on this collar 24, the threaded end 23 of the stem projects into the well 27. A nut 28 is then tightened on the threaded end 23 to seat on the bottom of the well 27 and clamp the handle between the flange 24 and the nut. If desired, of course, a washer could be used in place of the nut with the end of the stem being spun over the washer to lock it in position on the bottom of the well.

The squeeze bottle 14 is composed of any suitable inert resilient plastic material, such as polyethylene or the like, and has an externally threaded neck 29 adapted to be threaded into the internally threaded well 27 so that the interior 30 of the squeeze bottle will be in full communication with the bore 21 through the stem 12. The squeeze bottle 14, in its free state, has a barrel-like side configuration 31 extending the contour of the handle 13 to provide a convenient hand grip for the fork. The top end of the squeeze bottle is convex, as shown at 32 to provide a smooth contour.

As shown in FIGURE 3, the squeeze bottle can be depressed to eject the contents thereof through the stem and head passages for discharge out of the pointed ends 18 of the tines by depressing the squeeze bottle 14 from the fullline position at 31 to the dotted-line positions 31a, for example. fluid F, in the squeeze bottle, will thus be forcibly ejected through the passageways in the fork to impregnate meat or the like supported on the tines of the fork.

A feature of the invention is the provision of a plurality of squeeze bottles 14, shown in FIGURES 4 and 5, with a single fork 10 so that each bottle can be filled with different seasoning or tenderizing fluid. Thus, for example, as shown in FIGURES 1–3, the bottle 14 is filled with oil; whereas, in FIGURES 4 and 5, the bottle is filled with tenderizer fluids or seasoning fluids. When not in use, a bottle 14 receives a cover 33 which is threaded on the neck 29 of the bottle to seal the contents of the bottle and also to provide a flat base 34 for supporting the bottle.

When it is desired to use the fork in a conventional manner, the squeeze bottle 14 may be replaced with a cap 35, shown in FIGURE 6, of the same material as the handle. As therein shown, the wood handle 13 is completed with a wood cap 35 of desired shape and contour. The cap 35 has an externally threaded neck 36 which is threaded into the well 27 in the same manner as the squeeze bottle.

From the above description, it will, therefore, be understood that this invention provides a barbecue seasoning fork which can inject the contents of a squeeze bottle into the meat being barbecued.

Although minor modifications might be suggested by those versed in the art, it should be understood that I wish to embody within the scope of the patent granted hereon, all such modifications as reasonably and properly come within the scope of my contribution to the art.

I claim as my invention:

1. A seasoning fork which comprises a head having tines with pointed ends adapted to be injected into foodstuffs, a stem extending from said head, a partial handle on the end of said stem, said partial handle having an internally threaded well in the end thereof remote from said stem, a plurality of squeeze bottles and a rigid closure cap sized to be selectively and detachably received in threaded engagement therewith, each bottle adapted to contain and store a different fluid, said squeeze bottles and cap having a contour mating with the partial handle to provide a full hand grip for the fork, said stem and head having small diameter bores therethrough opening respectively at the bottom of said internally threaded well and at the pointed ends of said tines for conveying fluid from a squeeze bottle threaded into the well into foodstuffs supported on the tines, said squeeze bottles being resiliently deformable to force fluid therefrom through the passages, and said passages being relatively free of said fluids when the squeeze bottles are replaced with the closure cap for completing the hand grip.

2. The fork of claim 1 wherein the stem is a hollow tube with a first externally threaded end threaded into the head and a second externally threaded end projecting through the partial handle and into the bottom of the threaded well thereof, said second end having a collar spaced from the threaded portion thereof bottoming the partial handle, and a nut threaded on said second end of the stem bottomed in the well of said partial handle coacting with the collar to attach the partial handle to the tube.

References Cited

UNITED STATES PATENTS

| | | | |
|---|---|---|---|
| 749,414 | 1/1904 | Washington | 99—256 X |
| 1,030,306 | 6/1912 | Hall | 285—161 |
| 1,661,595 | 3/1928 | Bowen | 99—257 |
| 1,737,069 | 11/1929 | Barber | 99—256 |
| 2,234,884 | 3/1941 | Teel | 99—345 |
| 2,252,119 | 8/1941 | Edmonds | 222—215 X |
| 2,358,936 | 9/1944 | Mathis | 222—210 X |
| 2,743,042 | 4/1956 | Burgin | 222—191 |

FOREIGN PATENTS 96,466 10/1922 Switzerland.

ROBERT B. REEVES, *Primary Examiner.*

N. L. STACK, *Assistant Examiner.*